United States Patent [19]

Tsurushima

[11] Patent Number: 5,299,186
[45] Date of Patent: Mar. 29, 1994

[54] DISC PROTECTING COVER

[75] Inventor: Katsuaki Tsurushima, Kanagawa, Japan

[73] Assignee: Sony Corporation, Tokyo, Japan

[21] Appl. No.: 874,178

[22] Filed: May 29, 1986

[30] Foreign Application Priority Data

Sep. 29, 1984 [JP] Japan ................... 59-148105

[51] Int. Cl.⁵ .................. B65D 85/30; G11B 23/03
[52] U.S. Cl. ................... 369/291; 360/133; 206/310; 206/444
[58] Field of Search ............ 369/286, 288, 290, 291, 369/292; 360/133; 206/310, 307, 444

[56] References Cited

U.S. PATENT DOCUMENTS

| | | | |
|---|---|---|---|
| 2,501,465 | 3/1950 | Caramanoff | 369/290 |
| 3,949,872 | 4/1976 | Paudras | 206/310 |
| 3,961,656 | 6/1976 | Aggarwal | 369/291 X |
| 4,556,968 | 12/1985 | Pelkey et al. | 369/284 X |
| 4,613,921 | 9/1986 | Holmes | 360/133 |
| 4,672,600 | 6/1987 | Balston et al. | 369/283 X |
| 4,694,448 | 9/1987 | Tamaru et al. | 369/291 |
| 4,793,480 | 12/1988 | Gelardi et al. | 369/291 X |
| 4,879,710 | 11/1989 | Iijima | 369/291 |

OTHER PUBLICATIONS

*High Fidelity*, Dec. 1982, p. 45.

*Primary Examiner*—Stuart S. Levy
*Assistant Examiner*—Joseph A. Rhoa
*Attorney, Agent, or Firm*—Hill, Steadman & Simpson

[57] ABSTRACT

A disc protecting cover for preventing a disc used as an information recording medium from being damaged or wounded while the disc is not in use, which comprises a flat portion (11;11A) having a diameter smaller than that of a disc which is provided with a center hole and a signal reading surface portion formed on a part of the surface thereof extending around the center hole, and an engaging portion (12) projecting from a central part of the flat portion (11'11A) and adapted to be inserted into the center hole of the disc to engage with the same. The flat portion (11;11A) covers the signal reading surface portion of the disc when the engaging portion (12) is inserted into the center hole of the disc to engage with the same. The disc protecting cover is attached to the disc to be detachable therefrom and can reliably protect the signal reading surface portion of the disc against damage or wound without covering portions of the disc which are not required to be covered therewith.

8 Claims, 2 Drawing Sheets

DISC PROTECTING COVER

This application claims benefit of the filling date of PCT application PCT/JP85/00528 filed Sep. 24, 1985 designating the United States, which claims priority of Japanese application UM59/148105 filed Sep. 29, 1984.

TECHNICAL FIELD

The present invention relates to a disc protecting cover for preventing a disc used as an information recording medium, such as a digital audio disc, from being damaged while the disc is not in use.

TECHNICAL BACKGROUND

There has been proposed a digital audio disc which is a disc of relatively small diameter having a center hole and used as a record medium and on which digital information signals representing music or other are recorded in such a manner as to be read optically. The digital audio disc has a signal recording intermediate level which is formed in a plane portion extending around the center hole and on which information signals representing a number of units of music are recorded in such a manner as to be read by a player using a light beam for reading. One of outer surfaces of the digital audio disc facing each other with the signal recording intermediate level between is used as a signal reading surface.

When the information signal recorded in the digital audio disc is reproduced, a light beam is caused to impinge through the signal reading surface upon the signal recording intermediate level to read the information signal recorded thereon. Then, the light beam is reflected at the signal recording intermediate level to be formed into a relfex beam, and a reproduced information signal is obtained by detecting the relfex beam coming out the digital audio disc through the signal reading surface thereof. Accordingly, if the signal reading surface of the digital audio disc is damaged or wounded, the reproduced information signal is likely to include noise components resulting from the damage or wound on the signal reading surface so as to be deteriorated in its quality.

So, for the purpose of avoiding such a problem, the digital audio disc is usually contained in its entirety in a protecting case shaped into a box while it is not in use, so that the signal reading surface is protected against damage or wound.

As a disc with which reproduction of music sound is easily enjoyed, a kind of such a digital audio disc as aforementioned which is provided with a signal recording intermediate level on which a digital information signal representing only one or two units of music is recorded (hereinafter, referred to as a single disc)has been also proposed. The single disc is constituted, for example, as shown in FIG. 5 of the accompanying drawings.

In the single disc shown in FIG. 5, a signal recording intermediate level is formed in only a part of a plane portion 2 extending around a center hole 1, and a signal reading surface portion 3 is formed on only an annular portion in one of opposite surfaces of the plane portion 2, which is positioned to correspond to the signal recording intermediate level in the plane portion 2. An inner annular portion 4 in the surface of the plane portion 2, which is positioned at the inside of the signal reading surface portion 3 and an outer annular portion 5 in the surface of the plane portion 2, which is positioned at the outside of the signal reading surface portion 3 are not used as signal reading surface portions but used as, for example, areas on which labels are stuck.

As for such a single disc, it is also required to protect the signal reading surface portion 3 against damage or wound. Therefore, the single disc is preferably contained in its entirety in a box-shaped protecting case while it is not in use, in the same manner as an ordinary digital audio disc having one of opposite surfaces of its plane portion used in its entirety as a signal reading surface portion.

However, in the case where the single disc is contained in its entirety in the box-shaped protecting case for protecting the signal reading surface portion thereof against damage or wound, there is an unreasonableness that the box-shaped protecting case in which the single disc is contained in its entirety is used for protecting the signal reading surface portion of the single disc which is formed on only a partial area in one of the opposite surfaces of the plane portion of the single disc, which is relatively small compared with the whole opposite surfaces, so that portions of the single disc which are not required to be covered are also covered undesirably by the box-shaped protecting case without any benefit compensating for the disadvantage of augmentation in the external dimensions. Further, although main advantages of the single disc reside in cheapness and easy handling, the use of the box-shaped protecting case in which the single disc is contained in its entirety results in spoilage of such main advantages.

DISCLOSURE OF THE INVENTION

Accordingly, it is an object of the present invention to provide a disc protecting cover which can be applied to a disc having a signal reading surface portion formed on only a part of one of opposite surfaces of its plane portion extending around a center hole thereof, such as a single disc aformentioned, and can reliably protect the signal reading surface portion of the disc, without encountering the problems and disadvantages resulting from use of a previously proposed box-shaped protecting case in which the disc is contained in its entirety, while the disc is not in use.

In order to attain the above mentioned object, there is provided, in accordance with the present invention, a disc protecting cover comprising a flat portion having a diameter smaller than that of a disc which is provided with a center hole and a signal reading surface portion formed on a part of the surface thereof extending around the center hole, and an engaging portion projecting from a central part of the flat portion and adapted to be inserted into the center hole of the disc to engage with the same. The flat portion covers the signal reading surface portion of the disc when the engaging portion is inserted into the center hole of the disc to engage with the same.

When the disc protecting cover thus constituted in accordance with the present invention is applied to a disc which is provided with a center hole and a signal reading surface portion formed on only a part of the surface thereof extending around the center hole, such as a single disc, the engaging portion is inserted into the center hole of the disc to engage with the same and on that occasion the flat portion covers the signal reading surface portion of the disc in its entirety so as to prevent the same from being exposed to the outside. Accordingly, the disc protecting cover according to the present invention can reliably protect the signal reading surface portion of the disc, which is formed on only a part of the surface extending around the center hole of the disc and required to be protected against damage or wound, by covering effectively the same with the flat portion thereof without covering portions of the disc which are not required to be covered while the disc is not in use.

In addition, the disc protecting cover according to the present invention can be attached to the disc to be detachable therefrom in such a manner that the external dimensions of the disc are not augmented to be greater than the diameter of the disc under the condition wherein the signal reading surface portion of the disc is protected, and therefore can be handled very easily. Further, the disc protecting cover according to the present invention is obtained so cheaply compared with a previously proposed box-shaped protecting case, and in case of use with a single disc, can make the most of the advantages of the single disc residing in cheapness and easy handling.

EMBODIMENTS MOST PREFERABLE FOR WORKING OF THE INVENTION

Now, preferred embodiments of the present invention will be described in detail with reference to the accompanying drawings hereinafter.

Figure 1:
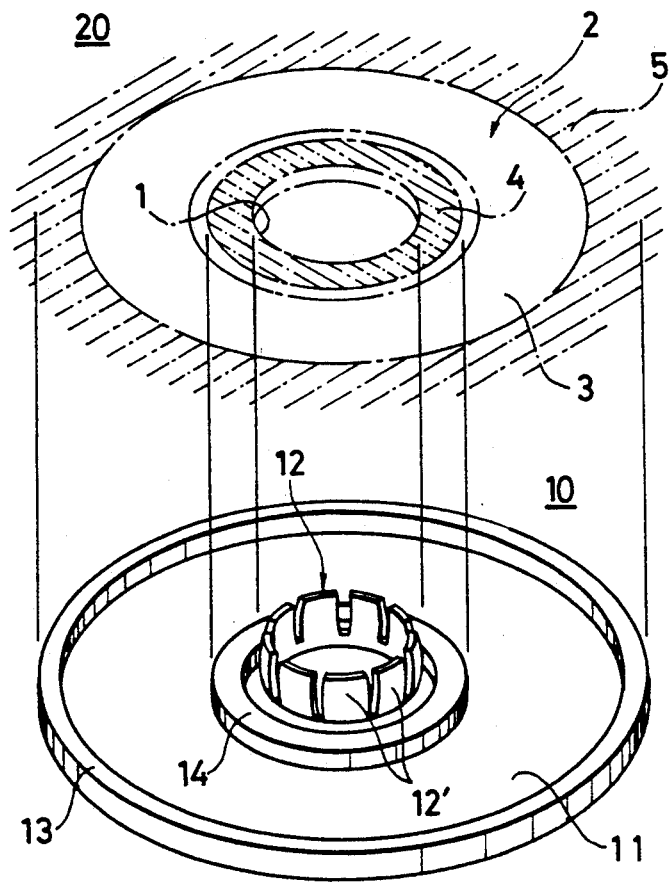
FIG. 1 is a perspective view showing an embodiment of disc protecting cover according to the present invention.
Figure 5:
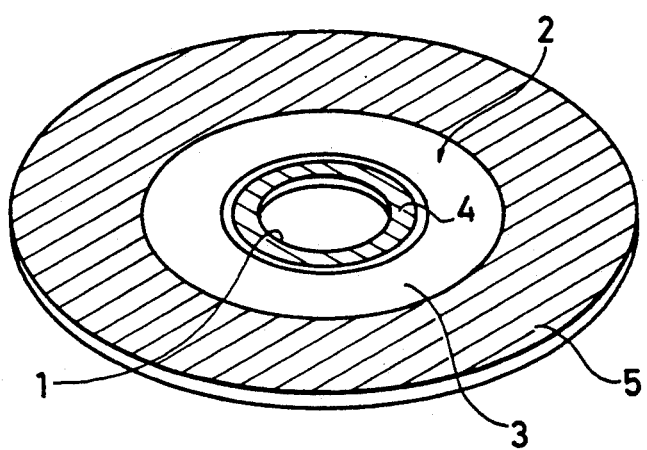
FIG. 5 is a perspective view showing a single disc.

FIG. 1 shows an example of a disc protecting cover according to the present invention. Referring to FIG. 1, a disc protecting cover 10 according to the present invention comprises a circular flat portion 11 and an engaging portion 12 provided at a central part of the circular flat portion 11, and may be made of plastics. This disc protecting cover 10 is to be applied to a single disc 20 which has a center hole 1 and a plane portion 2 extending around the center hole 1 with a signal reading surface portion 3, inner annular portion 4 and outer annular portion 5 formed thereon as shown in FIG. 5 and shown also with dot-dash lines in FIG. 1.

The circular flat portion 11 of the disc protecting cover 10 has a diameter thereof smaller than that of the single disc 20 but greater than an outer diameter of the signal reading surface portion 3 on the single disc 20. On one of opposite surfaces of the circular flat portion 11, annular embankments 13 and 14 are provided at the outer end and the central part thereof, respectively. The engaging portion 12 of the disc protecting cover 10 is formed in a body with the circular flat portion 11 to have a plurality of the inside of the annular embankment 14 provided at the central part of the circular flat portion 11. Each projecting member 12' is formed to be slightly curved outward so as to be elastic. Then, the outer diameter of the engaging portion 12 at the free ends of the projecting members 12' is designed to be smaller quite slightly than the diameter of the center hole 1 of the single disc 20, so that the engaging portion 12 can be inserted into the center hole 1 of the single disc 20 to engaging with the same.

Figure 2:
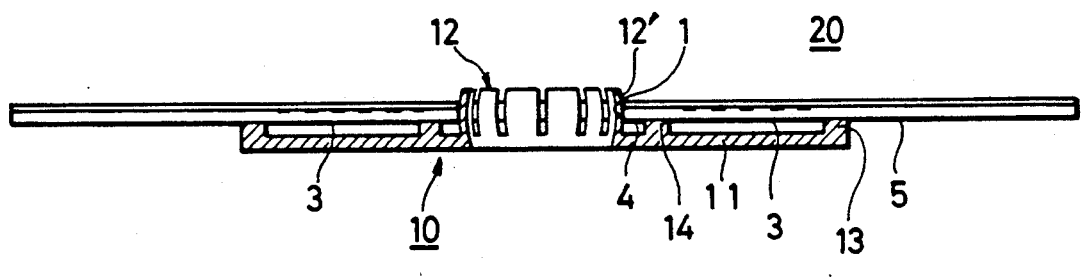
FIG. 2 is a cross-sectional view showing the embodiment shown in FIG. 1 with a disc to which the embodiment is applied.

The disc protecting cover 10 thus constituted is attached to the single disc 20 with the engaging portion 12 thereof inserted into the center hole 1 of the single disc 20 as shown in FIG. 2. Since each of the projecting members 12' forming the engaging portion 12 is curved outward to be elastic, the engaging portion 12 engages with the center hole 1 of the single disc 20 with friction force affecting between the outer surface of each projecting member 12' and the inner wall of the center hole 1 when it is inserted into the center hole 1, so that the disc protecting cover 10 is kept being attached to the single disc 20.

When the disc protecting cover 10 is attached to the single disc 20 as aforementioned, the annular embankments 13 and 14 provided on the circular flat portion 11 of the disc protecting cover 10 come in contact with the outer annular portion 5 provided at the outside of the signal reading surface portion 3 on the single disc 20 and with the inner annular portion 4 provided at the inside of the signal reading surface portion 3 on the single disc 20, respectively, and the signal reading surface portion 3 is covered by an annular part of the circular flat portion 11 between the annular embankments 13 and 14 without being in contant with the disc protecting cover 10.

In such a manner as mentioned above, the disc protecting cover 10 is attached to the single disc 20 with the engaging portion 12 thereof inserted into the center hole 1 of the single disc 20 to engage with the same and thereby protects the signal reading surface portion 3 on the single disc 20 against damage or wound with the circular flat portion 11 covering the same.

Figure 3:
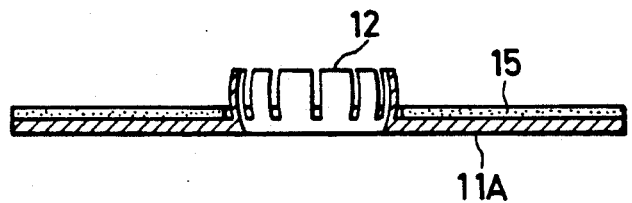
FIG. 3 and FIG. 4 are cross-sectional views showing other embodiments of disc protecting covers according to the present invention, respectively.

FIG. 3 shows another embodiment of disc protecting cover according to the present invention.

In this embodiment, a circular flat portion 11A provided with an engaging portion 12 at the central part thereof does not have any embankment corresponding to the annular embankment 13 or 14 shown in FIGS. 1 and 2, and an annular sheet 15 made of soft and resilient material such as felt or rubber is put on the circular flat portion 11A. When this embodiment is attached to, for example, the single disc 20 shown in FIG. 5 with the engaging portion 12 thereof inserted into the center hole 1 of the single disc 20 to engage with the same, the circular flat portion 11A causes the annular sheet 15 provided thereon to be in contact with the plane portion 2 of the single disc 20 so as to cover the signal reading surface portion 3 on the single disc 20 and thereby to protect the same against damage or wound.

Figure 4:
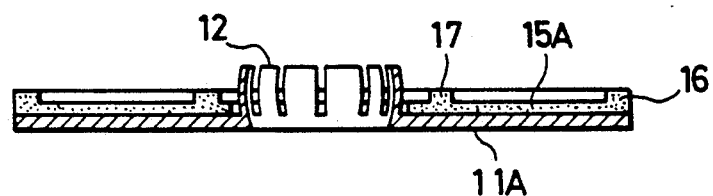

FIG. 4 shows a further another embodiment of disc protecting cover according to the present invention. In this embodiment, an annular sheet 15A made of soft and resilient material such as felt or rubber to have an annular embankment 16 provided on the outer end thereof and an annular embankment 17 surrounding an engaging portion 12 is put on a circular flat portion 11A, in place of the annular sheet 15 shown in FIG. 3. When this embodiment is attached to, for example, the single disc 20 shown in FIG. 5 with the engaging portion 12 thereof inserted into the center hole 1 of the single disc 20 to engage with the same, the annular embankments 16 and 14 provided on the annular sheet 15A come in contact with the outer annular portion 5 provided at the outside of the signal reading surface portion 3 on the single disc 20 and with the inner annular portion 4 provided at the inside of the signal reading surface portion 3 on the single disc 20, respectively, and the signal reading surface portion 3 is covered by a part of the annular sheet 15A between the annular embankments 16 and 17 and thereby protected against damage or wound without being in contant with the disc protecting cover 10.

With each of the embodiments shown in FIGS. 3 and 4, since the annular sheet 15 or 15A which is caused to be in contact with the plane portion 2 of the single disc 20 is made of the soft and resilient material, the plane portion 2 of the single disc 20 is prevented from being wounded even though the circular flat portion 11A is temporarily pressed down to the single disc 20 with undesirably increased pressure.

Applicability for Industrial Use

The disc protecting cover according to the present invention engages with the center hole of a disc to be attached to the disc and covers the signal reading surface portion of the disc to protect the same against damage or wound, and is therefore suitable for being used to protect such a disc as to have a center hole and a signal reading surface portion provided on only a part of opposite surfaces of a flat portion extending around the center hole and to be formed into an audio disc, video disc, memory disc used with a computer or the like.

I claim:

1. A disc protecting cover and a disc, said cover comprising a flat portion having a round profile having a diameter smaller than that of said disc which is provided with a center hole and a signal reading surface portion formed on a part of the surface thereof extending around the center hole, said cover also comprising an engaging portion projecting from a center part of the flat portion and adapted to be inserted into the center hole of the disc to engage with the disc, wherein said flat portion covers the signal reading surface portion of the disc when the engaging portion is inserted into the center hole of the disc to engage with the disc, wherein said flat portion is provided with annular embankments for coming in contact with an outer annular portion provided at the outside of the signal reading surface portion on the disc and with an inner annular portion provided at the inside of the signal reading surface portion of the disc, respectively, and wherein said engaging portion is resiliently compressed when inserted into the center hole of the disc to hold said flat portion against said disc.

2. A disc protecting cover and a disc, said cover comprising a round flat portion having a free edge having a diameter smaller than that of said disc which is provided with a center hole and a signal reading surface portion formed on a part of the surface thereof extending around the center hole, said cover also comprising an engaging portion projecting from a center part of the flat portion and adapted to be inserted into the center hole of the disc to engage with the disc, wherein said flat portion covers the signal reading surface portion of the disc when the engaging portion is inserted into the center hole of the disc to engage with the disc, wherein said flat portion is provided with an annular sheet formed of resilient material and superimposed thereon, and wherein said engaging portion is resiliently compressed when inserted into the center hole of the disc to hold said flat portion against said disc.

3. A disc protecting cover and a disc, said cover comprising a round flat portion having a free edge having a diameter smaller than that of said disc which is provided with a center hole and a signal reading surface portion formed on a part of the surface thereof extending around the center hole, said cover also comprising an engaging portion projecting from a center part of the flat portion and adapted to be inserted into the center hole of the disc to engage with the disc, wherein said flat portion covers the signal reading surface portion of the disc when the engaging portion is inserted into the center hole of the disc to engage with the disc, wherein said flat portion is provided with an annular sheet formed of resilient material to have arranged thereon annular embankments for coming in contact with an outer annular portion provided at the outside of the signal reading surface portion on the disc and with an inner annular portion provided at the inside of the signal reading surface portion on the disc, respectively, and wherein said engaging portion is resiliently compressed when inserted into the center hole of the disc to hold said flat portion against said disc.

4. A disc protecting cover and a disc, said disc comprising a center hole and a signal reading surface portion formed on a part of the surface thereof extending around the center hole, said cover consisting essentially of one flat portion having an overall outside shape having dimensions all around so as not to protrude outwardly of said disc when installed onto said disc, and an engaging portion projecting from a center part of the flat portion and adapted to be inserted into the center hole of the disc to engage with the disc, wherein said flat portion covers the signal reading surface portion of the disc when the engaging portion is inserted into the center hole of the disc to engage with the disc, and wherein said engaging portion is resiliently compressed when inserted into the center hole of the disc to hold said flat portion against said disc.

5. A disc protecting cover and a disc according to claim 4, wherein said signal reading surface portion is surrounded by an outer annular portion, and wherein said flat portion is provided with an outside annular embankment for coming in contact with said outer annular portion.

6. A disc protecting cover and disc according to claim 4, wherein said engaging portion comprises a plurality of projecting members having free ends projecting from said flat surface, an outside diametrical spacing of said plurality of projecting members at said free ends being slightly less than a diameter of said center hole, said projecting members curving outwardly with respect to each other from said free ends toward said flat portion, said free ends inserted into said center hole, said projecting member flexing inwardly and engaging said center hole frictionally to hold said cover to said disc.

7. A disc protecting cover and a disc, said cover comprising a flat portion having an overall profile having outside dimensions all around smaller than that of said disc, said disc having a center hole and a signal reading surface portion formed on a part of the surface thereof extending around the center hole, and an engaging portion projecting from a central part of the flat portion and adapted to be inserted into the center hole of the disc to engage with the disc, wherein said flat portion covers the signal reading surface portion of the disc when the engaging portion is inserted into the center hole of the disc to engage with the disc, and wherein said engaging portion is resilient compressed when inserted into the center hole of the disc and resiliently expands once fully inserted, to hold said flat portion against said disc.

8. A disc protecting cover and disc according to claim 7, wherein said engaging portion comprises a plurality of projecting members having free ends projecting from said flat surface, an outside diametrical spacing of said plurality of projecting members at said free ends being slightly less than a diameter of said center hole, said projecting members curving outwardly with respect to each other from said free ends toward said flat portion, said free ends inserted into said center hole, said projecting members flexing inwardly and engaging said center hole frictionally to hold said cover to said disc.

* * * * *